US008737056B2

(12) United States Patent  (10) Patent No.: US 8,737,056 B2
Chen  (45) Date of Patent: May 27, 2014

(54) MOUNTING APPARATUS AND VIBRATION DAMPENING STRUCTURE FOR ELECTRONIC DEVICE

(75) Inventor: Li-Ping Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 215 days.

(21) Appl. No.: 13/411,734

(22) Filed: Mar. 5, 2012

(65) Prior Publication Data

US 2013/0003290 A1  Jan. 3, 2013

(30) Foreign Application Priority Data

Jun. 30, 2011 (TW) .............................. 100123021 A

(51) Int. Cl.
*G06F 1/16* (2006.01)
(52) U.S. Cl.
USPC .................................................. 361/679.34
(58) Field of Classification Search
USPC ....................... 361/679.34, 679.36
See application file for complete search history.

(56) References Cited

U.S. PATENT DOCUMENTS

| 7,450,375 | B2* | 11/2008 | Xu ............................ 361/679.33 |
| 7,616,436 | B2* | 11/2009 | DeMoss et al. .......... 361/679.34 |
| 7,701,707 | B2* | 4/2010 | Peng et al. ................ 361/679.37 |
| 8,070,125 | B2* | 12/2011 | Sun ................................ 248/560 |
| 8,289,693 | B2* | 10/2012 | Li .............................. 361/679.34 |
| 8,416,562 | B2* | 4/2013 | Ding ......................... 361/679.33 |
| 8,432,680 | B2* | 4/2013 | Peng et al. ................ 361/679.36 |
| 8,479,899 | B2* | 7/2013 | Ohtake et al. ................ 188/379 |
| 2008/0259554 | A1* | 10/2008 | Qin et al. ....................... 361/685 |
| 2009/0129009 | A1* | 5/2009 | Zhang et al. ............. 361/679.34 |
| 2010/0103607 | A1* | 4/2010 | Chen et al. ............... 361/679.36 |
| 2010/0259885 | A1* | 10/2010 | Zheng et al. ............. 361/679.36 |
| 2010/0327133 | A1* | 12/2010 | Dai .......................... 248/220.31 |

* cited by examiner

*Primary Examiner* — Lisa Lea Edmonds
(74) *Attorney, Agent, or Firm* — Novak Druce Connolly Bove + Quigg LLP

(57) ABSTRACT

A vibration dampening structure mounted on a mounting apparatus for a storage module includes a dampening member and a fastener. The dampening member defines a through hole. The fastener includes a head portion and a neck portion extending from the head. The neck portion is received in the through hole. The head portion has a smooth face to decrease friction between the head portion and the data storage module movable relative to the head.

15 Claims, 6 Drawing Sheets

MOUNTING APPARATUS AND VIBRATION DAMPENING STRUCTURE FOR ELECTRONIC DEVICE

BACKGROUND

1. Technical Field

The present disclosure relates to mounting apparatuses and vibration dampening structures for electronic devices, and particularly to a mounting apparatus and a vibration dampening structure for a data storage module.

2. Description of Related Art

A computer is provided with a mounting bracket to secure a data storage module. Because surfaces of the data storage module and surfaces of the mounting bracket are rough, friction generated between the data storage module and the mounting bracket can block movement of the data storage module when the data storage module is inserted into the mounting bracket. Thus, the data storage module is difficult to install.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
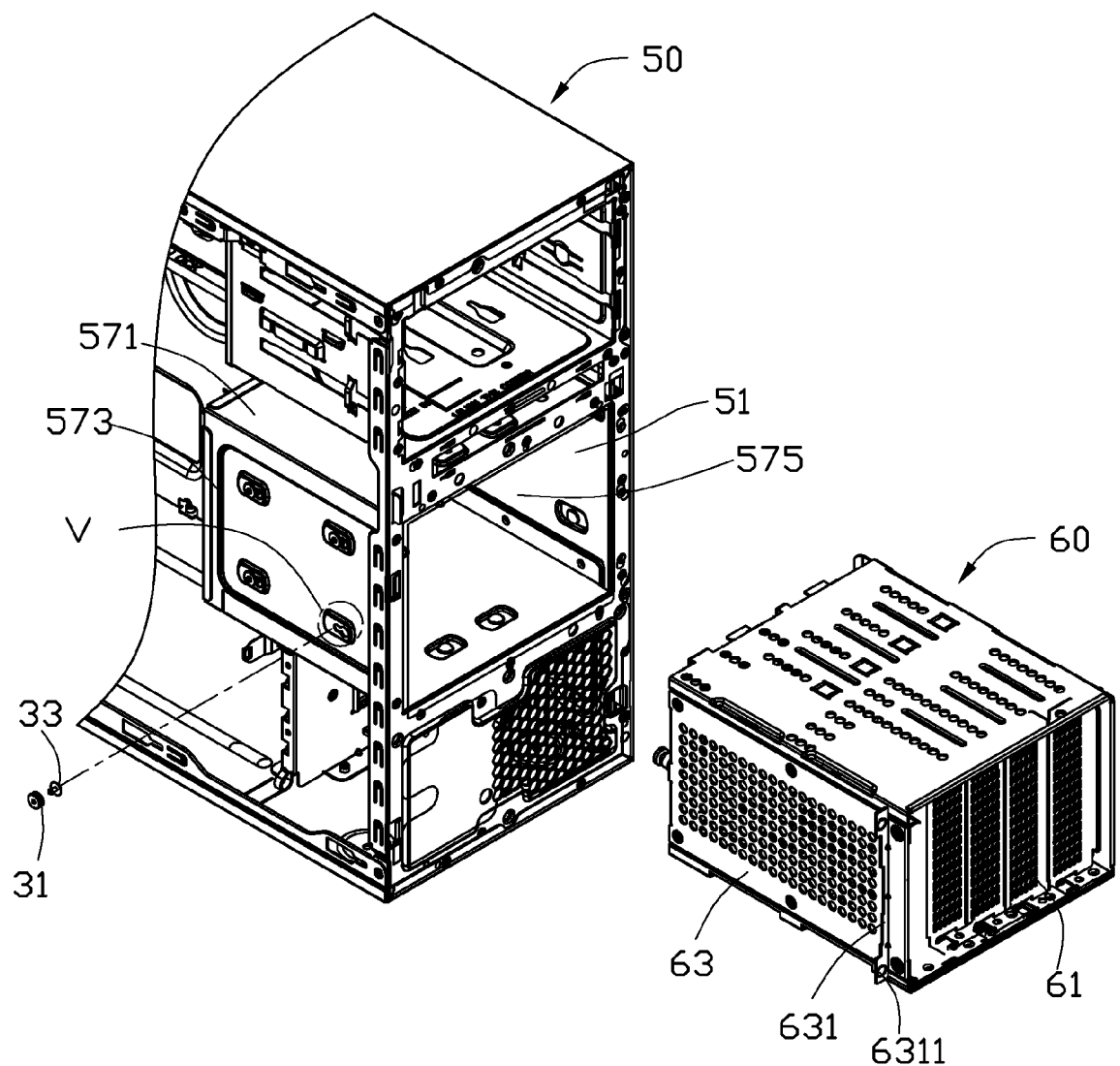
FIG. 1 is an exploded, isometric view of an embodiment of a mounting apparatus and a data storage module.
Figure 2:
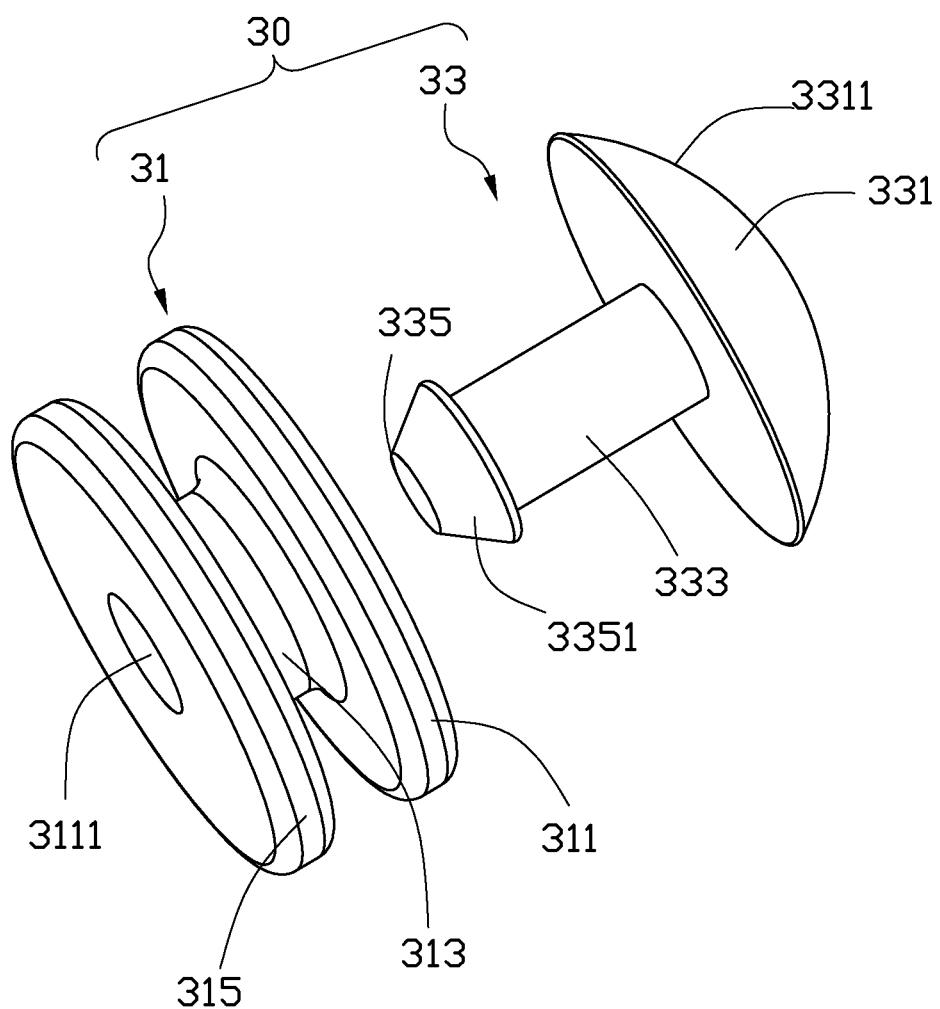
FIG. 2 is an exploded, isometric view of a vibration dampening structure.

Referring to FIG. 1 and FIG. 2, one embodiment of a mounting apparatus, configured for securing a data storage module 60, includes a chassis 50 and a vibration dampening structure 30. The vibration damping structure 30 is configured for absorbing vibrations generated from the data storage module 60.

Figure 3:
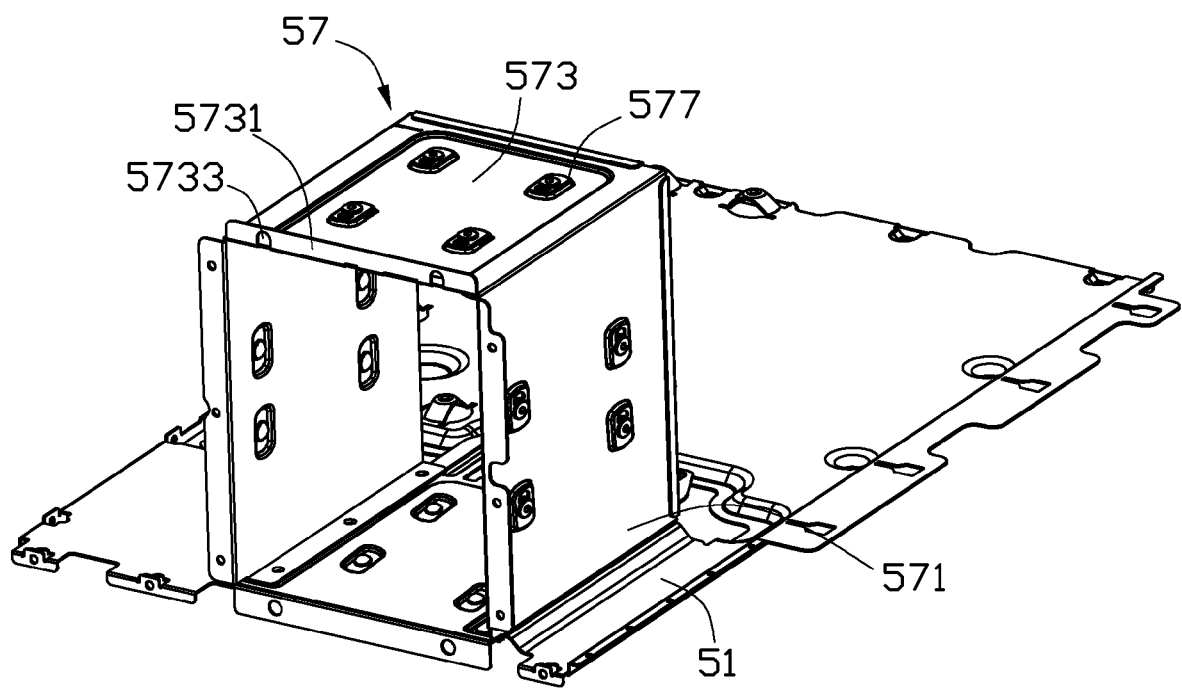
FIG. 3 is a partly assembled view of the mounting apparatus of FIG. 1.
Figure 5:
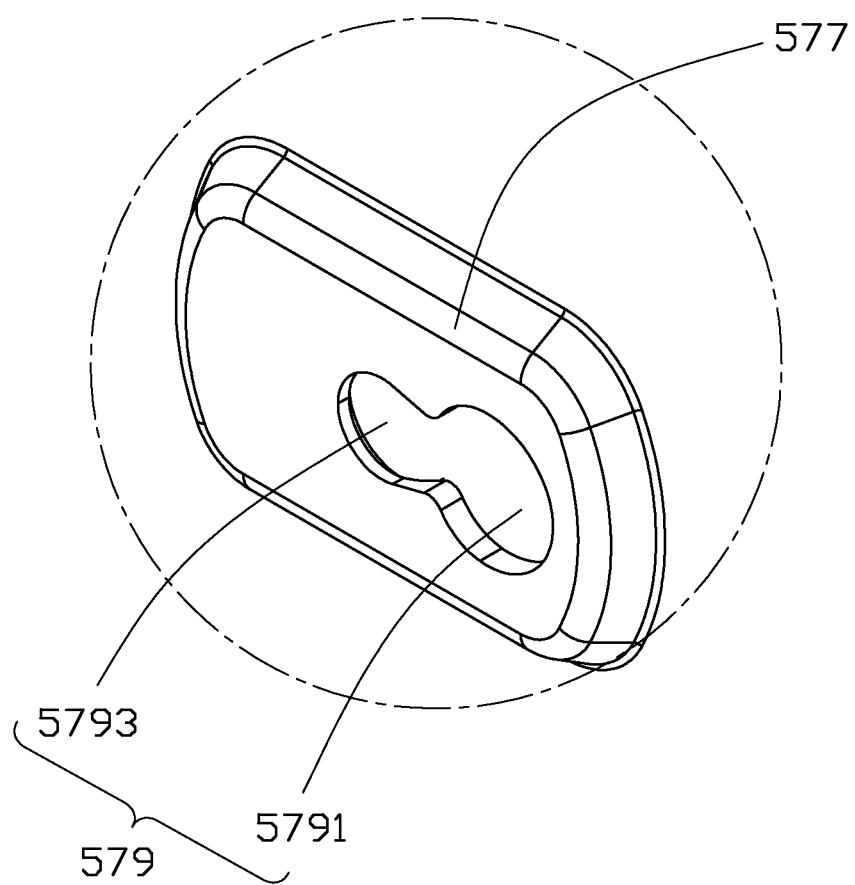
FIG. 5 is an enlarged view of the circle portion V of FIG. 1.

Referring also to FIG. 3, the chassis 50 comprises a sidewall 51 and a mounting bracket 57 located on the sidewall 51. The mounting bracket 57 comprises two first plates 571 and a second plate 573 connected to the two first plates 571. The two first plates 571, the second plate 573, and the sidewall 51 cooperatively define a cavity 575. In one embodiment, each of the two first plates 571 is substantially perpendicular to the sidewall 51, and the second plate 573 is substantially perpendicular to each of the two first plates 571 and substantially parallel to the sidewall 51. A positioning piece 5731 extends outwardly from the second plate 573, and two positioning holes 5733 are defined in the positioning piece 5731. In one embodiment, the positioning piece 5731 is substantially perpendicular to the second plate 573. Four protrusions 577 protrude from each of the two first plates 571, the second plate 573, and the sidewall 51. Referring also to FIG. 5, each of the protrusions 577 defines an installation hole 579. Each of the installation holes 579 comprises a wide portion 5791 and a narrow portion 5793 communicating with the wide portion 5791.

Referring to FIG. 1, the storage module 60 comprises a plurality of storage devices 61, an installation bracket 63, and a limiting piece 631 extending from the installation bracket 63. Two limiting holes 6311 are defined in the limiting piece 631.

Referring to FIG. 2, the vibration dampening structure 30 comprises a dampening member 31 and a fastener 33. The dampening member 31 comprises a first dampening portion 311, a second dampening portion 315, and a connecting portion 313 extending from the first dampening portion 311 to the second dampening portion 315. A through hole 3111 is defined in a center portion of the dampening structure 31 and extends through the first dampening portion 311, the connecting portion 313, and the second dampening portion 315. In one embodiment, a diameter of the first dampening portion 311 is greater than that of the connecting portion 313, and a diameter of the second dampening portion is greater than that of the connecting portion 315.

The fastener 33 comprises a head portion 331, a stopping portion 335, and a neck portion 333 extending from the head portion 331 to the stopping portion 335. The head portion 331 comprises a smooth face 3311 configured for decreasing friction between the head portion 331 and the storage module 60. In one embodiment, the smooth face 3311 is substantially arc-shaped, and the head portion 331 is substantially hemispherical. The stopping portion 335 comprises an inclined surface 3351 configured as a guiding surface for conveniently installing the fastener 33.

In assembly, the fastener 33 is extended through the through hole 3111 of the dampening member 31 with the head portion 331 abutted against the first dampening portion 311, and the stopping portion 335 extends through the second dampening portion 315 such that the neck portion 333 is received in the through hole 3111 and the stopping portion 335 abuts the second dampening portion 315. In one embodiment, each of the fasteners is made of metal, and each of the dampening members is made of oak.

Figure 6:
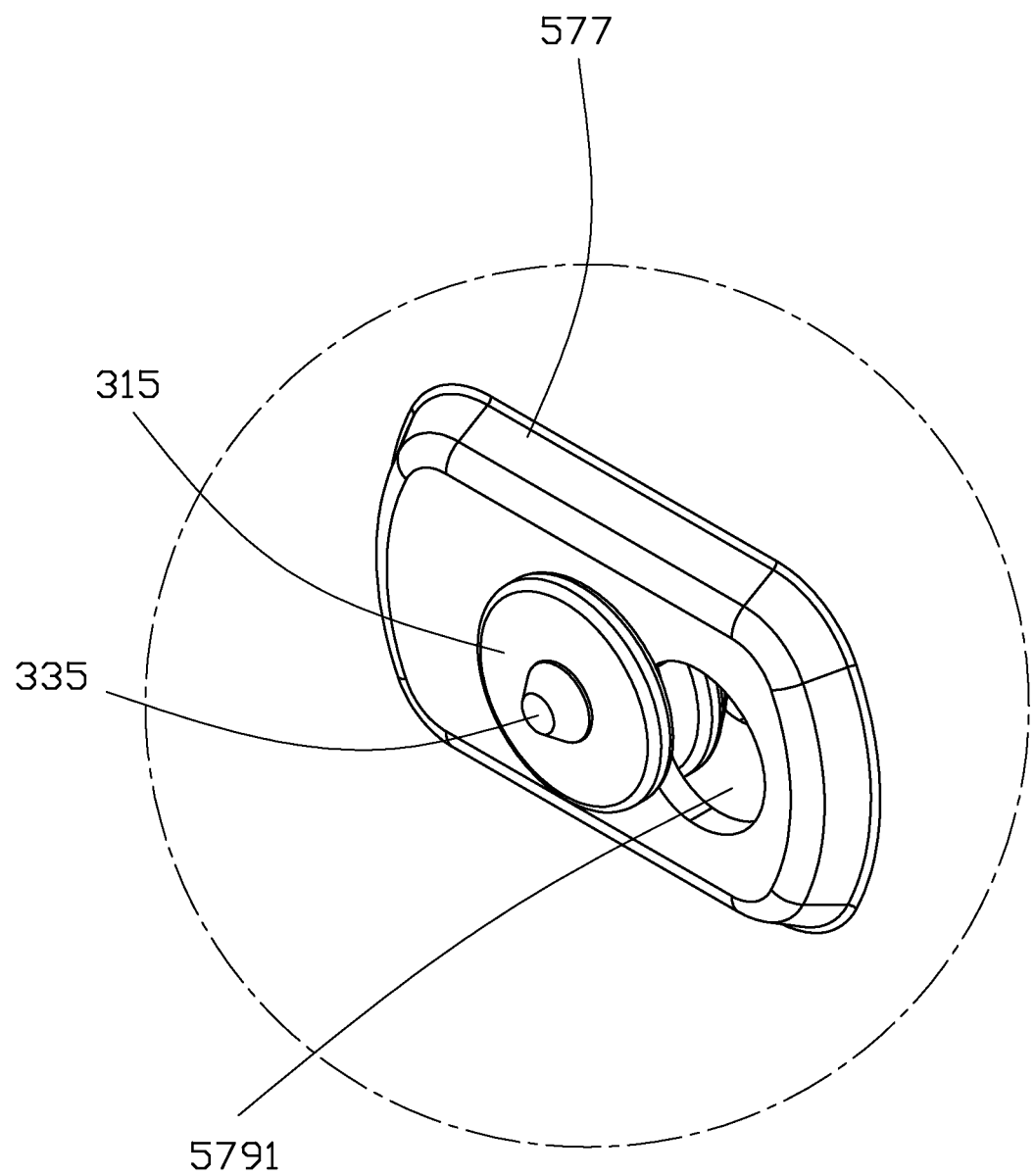
FIG. 6 is an enlarged view of the circle portion VI of FIG. 4.

Referring to FIGS. 3 and 6, each of the vibration dampening structures 30 is installed in each of the installation holes 579 of the protrusions 577. Each of the second dampening portions 315 is inserted through the wide portion 5791 until the second dampening portion 315 passes through such that both the first dampening portion 311 and the second dampening portion are on opposite sides of the protrusions 577. Each of the vibration dampening structures 30 is then pushed towards the narrow portion 5793, until the connecting portion 313 is engaged in the narrow portion 5793. Each of the vibration dampening structures 30 are installed such that the head portions 331 are inside of the cavity 575, the first dampening portions 311 abut inner edges of the installation holes 579, and the second dampening portions 315 abut outer edges of the installation holes 579.

Figure 4:
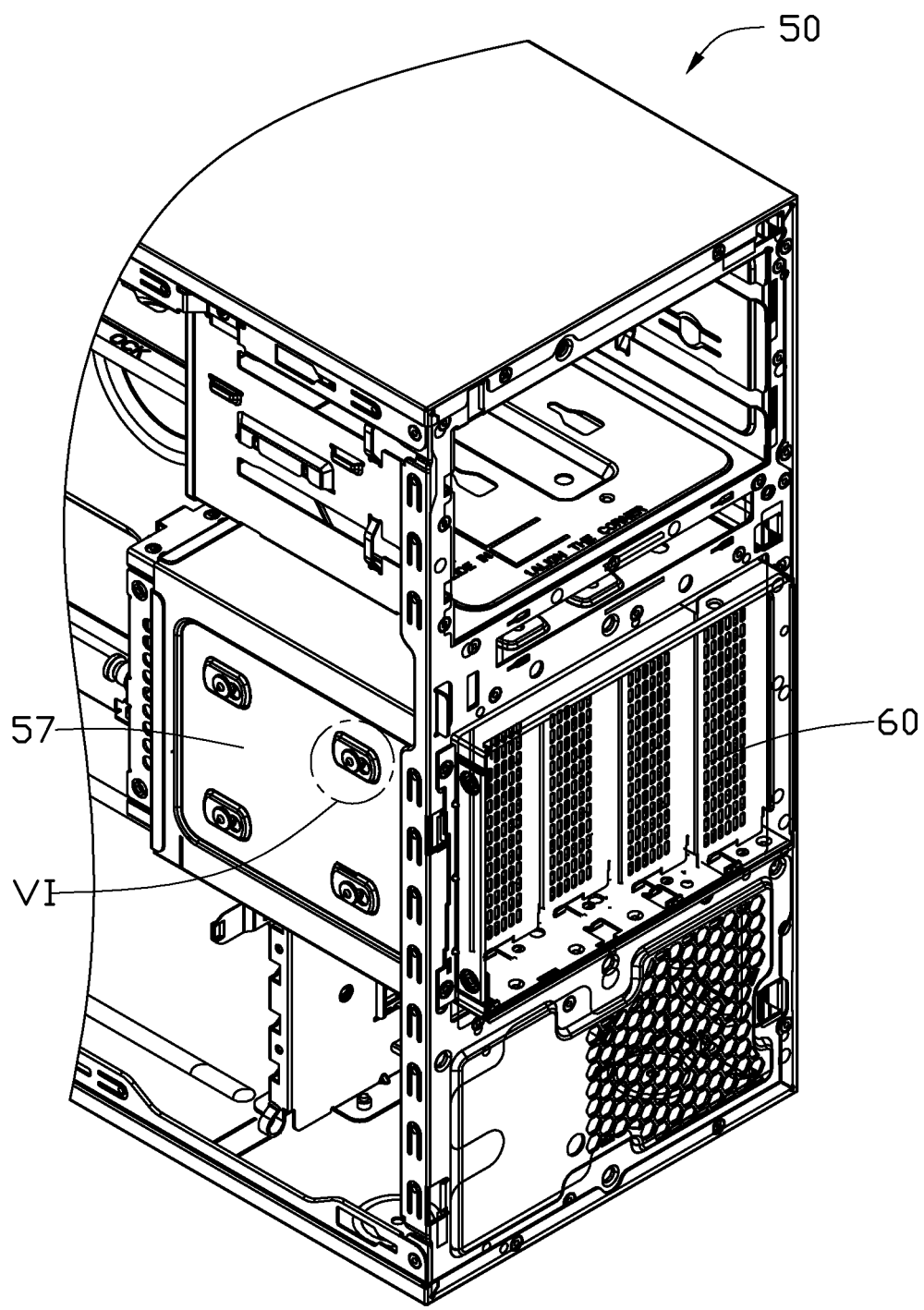
FIG. 4 is an assembled view of the mounting apparatus and the storage module of FIG. 1.

Referring to FIG. 4, in assembly of the storage module 60, the storage module slides on each of the heads 331 into the cavity 575, until the limiting piece 631 of the storage device 60 abuts the positioning piece 5731. The two limiting holes 6311 are aligned with the two positioning holes 5733. Fasteners can then be inserted through the limiting holes 6311 and the positioning holes 5733 to securely mount the storage module 60 to the chassis 50.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a data storage module comprising:
   a chassis comprising a sidewall and a mounting bracket located on the sidewall, the sidewall and the mounting bracket cooperatively defining a cavity for receiving the data storage module; and
   a plurality of vibration dampening structures, each of the vibration dampening structures comprising a dampening member and a fastener engaged in the dampening member, wherein each of the dampening members is secured to the mounting bracket, and each of the fasteners comprises a head portion having a smooth surface for decreasing the friction between the head portions and the data storage module when the data storage module is contacting the head portions.

2. The mounting apparatus of claim 1, wherein a plurality of protrusions extends from each of the sidewall and the mounting bracket, each of the protrusions defines an installation hole, and each of the dampening members is engaged in each of the installation holes.

3. The mounting apparatus of claim 1, wherein each of the installation holes comprises a wide portion and a narrow portion communicating with the wide portion, each of the dampening members comprising a first dampening portion, a second dampening portion, and a connecting portion extending from the first dampening portion to the second dampening portion, and each of the second dampening portions extends through the wide portion and the connecting portion to be engaged in each of the narrow portions.

4. The mounting apparatus of claim 3, wherein a through hole is defined in a center portion of each of the dampening structures, each of the fasteners further comprises a stopping portion and a neck portion extending from the head portion to the stopping portion, each of the stopping portions extends through each of the through holes until the neck portions are received in each of the through holes, each of the head portions abuts each of the first dampening portions, and each of the stopping portions abuts each of the second dampening portions.

5. The mounting apparatus of claim 3, wherein a diameter of each of the first dampening portions is greater than that of each of the connecting portions, and a diameter of each of the second dampening portions is greater than a diameter of each of the connecting portions.

6. The mounting apparatus of claim 1, wherein each of the smooth surfaces of the head portions is substantially arc-shaped.

7. The mounting apparatus of claim 1, wherein each of the head portions is substantially hemispherical.

8. The mounting apparatus of claim 1, wherein each of the fasteners is made of metal, and each of the dampening members is made of oak.

9. A vibration dampening structure for a storage module comprising:
   a dampening member, the dampening member defining a through hole; and
   a fastener comprising a head portion and a neck portion extending from the head portion, the neck portion being received in the through hole, the head portion abutting the dampening member and having a smooth surface to decrease friction between the head portion and the storage module when the storage module is moved on the head portions.

10. The vibration dampening structure of claim 9, wherein the smooth surface is substantially arc-shaped.

11. The vibration dampening structure of claim 9, wherein the fastener further comprises a stopping portion connected to the neck portion opposite to the head portion, the dampening member comprises a first dampening portion, a second dampening portion, and a connecting portion extending from the first dampening portion to the second dampening portion, the head portion abuts the first dampening portion, and the stopping portion abuts the second dampening portion.

12. The vibration dampening structure of claim 11, wherein a diameter of the first dampening portion is greater than a diameter of the connecting portion, and a diameter of the second dampening portion is greater than a diameter of the connecting portion.

13. The vibration dampening structure of claim 11, wherein the stopping portion comprises an inclined surface.

14. The vibration dampening structure of claim 9, wherein the head portion is substantially hemispherical.

15. The vibration dampening structure of claim 9, wherein the fastener is made of metal, and the dampening member is made of oak.

* * * * *